United States Patent
Geier et al.

[11] Patent Number: 6,151,551
[45] Date of Patent: Nov. 21, 2000

[54] METHOD AND APPARATUS FOR GENERATING AN INDICATION OF LOSS OF POSITIONING INTEGRITY IN EMERGENCY CALL SYSTEMS

[75] Inventors: George Jeffrey Geier, Scottsdale, Ariz.; Chu Gen Wang, Naperville, Ill.

[73] Assignee: Motorola, Inc., Schaumburg, Ill.

[21] Appl. No.: 08/810,278

[22] Filed: Mar. 3, 1997

[51] Int. Cl.[7] .................................................. G06F 165/00
[52] U.S. Cl. ...................... 701/207; 701/214; 340/425.5; 340/438; 342/357.01; 342/357.02; 342/357.08
[58] Field of Search .................................. 701/207, 213, 701/214, 215, 216, 217; 342/457, 357, 357.01, 357.02, 357.07, 357.08; 73/178 R; 340/438, 439, 425.5

[56] References Cited

U.S. PATENT DOCUMENTS

| 5,416,712 | 5/1995 | Geier et al. | 701/217 |
| 5,436,632 | 7/1995 | Sheynblat | 342/357.1 |
| 5,630,209 | 5/1997 | Wizgall et al. | 455/66 |
| 5,862,511 | 1/1999 | Croyle | 701/213 |

*Primary Examiner*—William A. Cuchlinski, Jr.
*Assistant Examiner*—Gertrude Arthur
*Attorney, Agent, or Firm*—Bradley J. Botsch; Nicholas C. Hopman; John J. King

[57] ABSTRACT

The present invention provides an assessment, in real-time, of the integrity of the positioning solution and navigation sensors used to support an Emergency Calling System (ECS) that integrates positioning and cellular phone technology. This integrity information is used, via a warning light displayed to the driver, to indicate when the system will not support Emergency Calling to the accuracies required. The present invention discusses that at least two types of warnings may be generated and provided to the user. The first being an indication that the positioning accuracy will no longer support Emergency Calling. The second being an indication that a sensor or subsystem of the Emergency Call positioning system is malfunctioning and should be serviced as soon as possible whereby such a malfunction may lead to eventual failure of the system.

14 Claims, 3 Drawing Sheets

METHOD AND APPARATUS FOR GENERATING AN INDICATION OF LOSS OF POSITIONING INTEGRITY IN EMERGENCY CALL SYSTEMS

BACKGROUND OF THE INVENTION

This invention relates to emergency call systems and, in particular, to a technique for indicating the loss of position of an emergency call system.

Emergency Call Systems (ECS), which integrate positioning and cellular phone technology, are gaining in popularity since the introduction of the Ford RESCU system. These systems provide the driver of a suitably equipped automobile push-button access to emergency services (e.g., as can be accessed through 911 calling), as well as roadside assistance. In addition, the emergency call may be activated by airbag deployment and request emergency services even when the driver is unconscious. When the request for emergency services is made, the ECS sends positioning information supplied by the navigation system to a service center by placing a call using the ECS cellular phone.

However, except when such a request is made and the results are observed, the driver is unaware of the status of the ECS system. Such a drawback may lead to system failure if the navigation system is not performing as expected.

Referring to U.S. Pat. No. 5,479,482, an emergency messaging system is disclosed. However, such system does not address the issue of navigation solution integrity. At best, the Õ482 patent discloses a warning light that is lit only when a malfunction of the cellular link is detected. No indication of the integrity of the positioning solution is even considered or addressed.

Accordingly, the present invention provides an assessment, in real-time, of the integrity of the positioning solution and navigation sensors used to support an Emergency Calling System (ECS) for automotive applications. This integrity information is used, via a warning light displayed to the driver, to indicate when the system will not support Emergency Calling to the accuracies required. This indication is essential to the successful operation of the system, as loss of positioning accuracy can lead to loss of life in a worst-case scenario.

DETAILED DESCRIPTION OF THE DRAWINGS

An emergency call system (ECS) may be any type of system that provides assistance when its operator or user is in distress. In accordance with the present invention, an ECS may be a system installed on a movable vehicle such that when the system manually or automatically detects when its user is in distress and help is needed, the ECS system establishes a communication link, such as via a cellular telephone infrastructure system, with an external source or authority whereby information regarding the location of the movable vehicle is transmitted and is determined via an on-board navigational system within the ECS. Accordingly, the external source receives such information from the movable vehicle including that the user of the movable vehicle is in distress and the location of the movable vehicle. In response thereto, the external source may dispatch help immediately and to the proper location. Prior to the dispatch, the external source may attempt to establish communication with the vehicle whereby if such communication fails, an emergency and potentially life threatening situation is assumed. On the other hand, direct communication may prove that an emergency is not present, and so avoid a false alarm condition.

Figure 1:
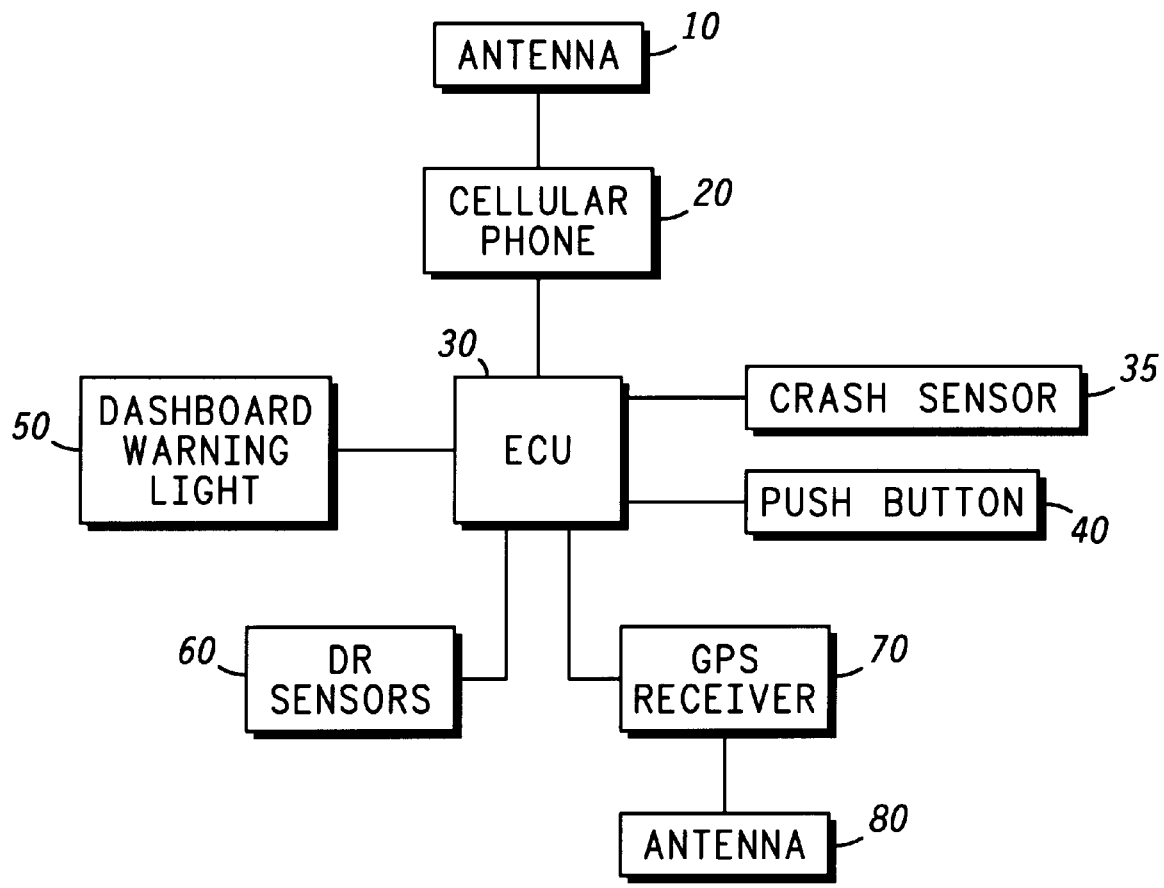
FIG. 1 is a block diagram illustrating the hardware components of a Emergency Call System.

FIG. 1 illustrates the major components of the Emergency Call System (ECS) which is suitable for installation on a movable vehicle for transmitting the location of the vehicle automatically, manually, or upon request, to an emergency center via a communication link such as a cellular telephone link or a satellite link. The Emergency Control Unit (ECU) 30, at the heart of the ECS, provides the interface to the global positioning satellite (GPS) receiver 70 which may be used alone or in combination with an optional dead reckoning (DR) system such as vehicle DR sensors 60, the crash sensor 35 which can automatically activate the emergency call, and the push button 40 which can manually activate the emergency call, and the dashboard warning light 50 which indicates the status or integrity of the system to the driver or test/repair person. GPS receiver 70 determines the information relating to the location of the vehicle as well as includes navigation algorithms for generating the integrity information which drives the dashboard warning light 50 displayed to the driver.

The ECU 30 also provides the necessary communications interface to the cellular telephone 20 for transmission of data to an emergency service center. The data transmitted to the emergency service center may include data indicating the vehicles position, voice data from the user of the ECS, the telephone number of the cellular phone within the vehicle, and/or data information indicating various emergency conditions such as flat tire, overheated radiator, in addition to the driver's identity (communicated verbally). An identification of the driver can be of benefit to emergency service personnel if his or her medical history is known by the service center (i.e., as part of a data base for its customers).

In accordance with the present invention, at least two types of warnings may be generated: (1) an indication that the positioning accuracy will no longer support Emergency Calling, and/or (2) an indication that a sensor or subsystem of the Emergency Call positioning system is malfunctioning. The former being a warning indicating that the ECS does not work and needs to be repaired immediately before it can be relied on. The latter being a warning indicating that the ECS is malfunctioning and should be serviced as soon as possible to avoid total failure.

The predicted position accuracy derived from the GPS receiver 70 is a direct output of the positioning algorithm whereby the navigation solution may be derived by either a Least Squares (LS) algorithm, a Weighted Least Squares (WLS) algorithm, or a Kalman filter algorithm. In each case, either scaled or unscaled covariance information may be derived and used as an indication of the accuracy of the navigation solution. This information may then be used to "flag" various error conditions including: (1) complete loss of GPS positioning (e.g., as could be induced by a malfunctioning GPS antenna), (2) loss of GPS positioning for an excessive time period, especially with uncalibrated DR sensors for a positioning system which integrates GPS with DR sensors, (3) intentionally degraded GPS position accuracy GPS satellite clock failures, (4) DR sensor failures (for a positioning system which integrates GPS with DR sensors).

Referring to condition (1), if the GPS antenna cable is not operating properly, a positioning system which integrates GPS with DR sensors will simply dead reckon from the last integrated position with an accuracy which degrades as a function of distance traveled and the quality of the DR sensor calibration. Without DR sensors, the error will grow with a magnitude equal to the distance traveled by the vehicle from the last GPS position fix.

Referring to condition (2), a loss of GPS for an extended period of time may induce an excessive position error in integrated positioning systems. For example, GPS must be lost for 1 kilometer of travel for the position error to be considered excessive when using an uncalibrated DR system. However, once the DR system is calibrated, roughly 5 kilometers of travel without GPS may be tolerated.

Although unlikely, condition (3) reflects that GPS accuracy can be intentionally degraded by the Department of Defense, and lead to excessive position errors. Fortunately, however, users of GPS are informed of such degradations through the broadcast of a User Range Accuracy (URA) parameter whereby the positioning algorithm makes use of this information in predicting the positioning accuracy.

Further, failures in the GPS satellite clocks are more likely than this intentional degradation, and can significantly degrade the accuracy of the resultant GPS fixes.

Finally, referring to condition (4), DR sensors, integrated with GPS positioning systems, may malfunction which, by themselves, do not imply a loss of positioning accuracy, but may lead to excessive error growth during periods of GPS loss.

All of the above conditions may cause the accuracy of the determined position of the ESC to be in error to the extent that such position information should not be relied upon and the system should be tested and repaired.

Figure 2:
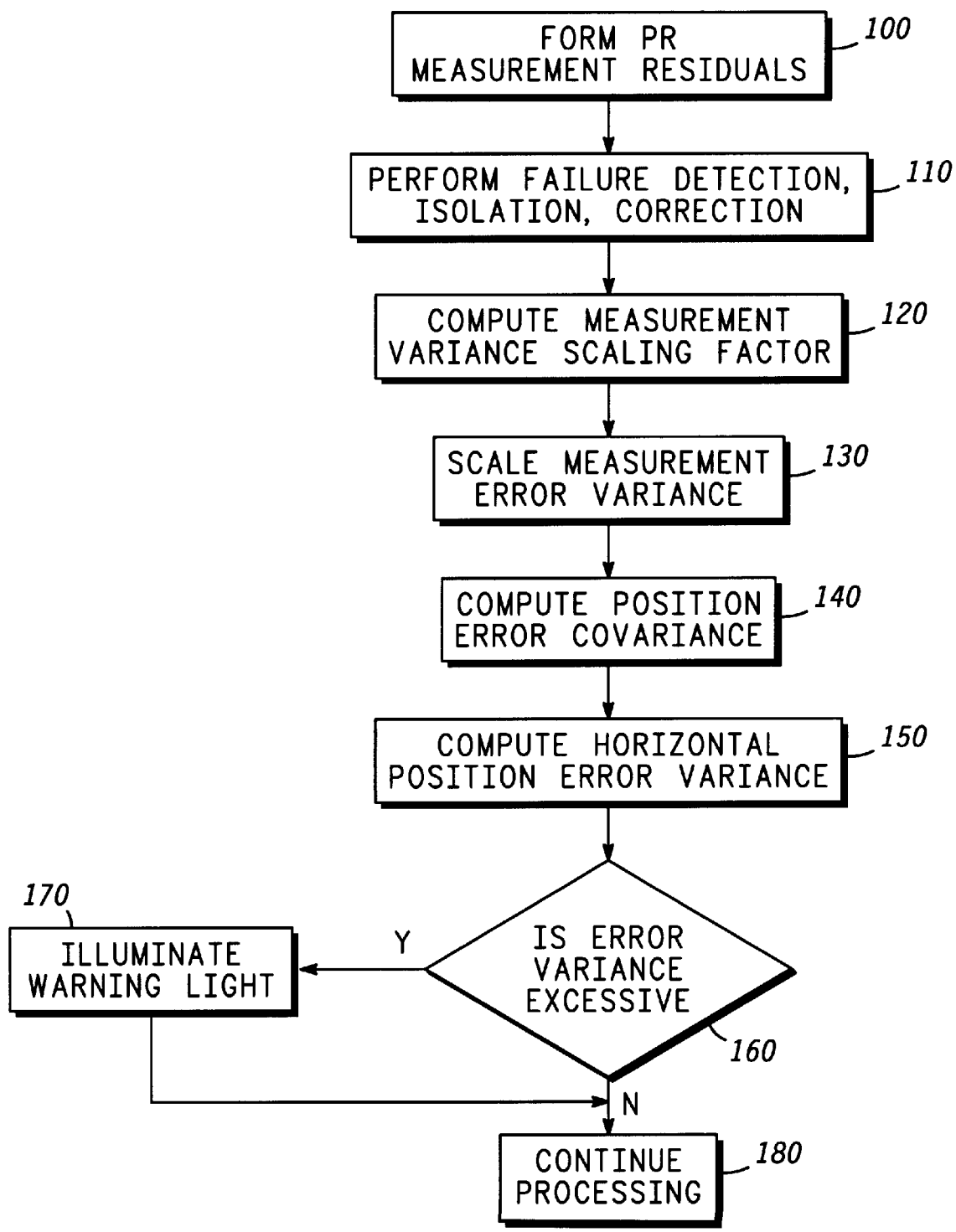
FIG. 2 is a flowchart illustrating the steps for indicating a loss of overall positioning system integrity to a driver of a movable vehicle, in accordance with the present invention.

Referring to FIG. 2, a flowchart illustrating the steps for providing a warning signal for indicating a loss of overall positioning system integrity is shown. Such a warning signal indicates that the system's positioning accuracy no longer supports the required accuracy of the ECS and should be serviced immediately before it can be relied upon. The software that performs the integrity checking of the real-time navigation solution is typically resident within the GPS receiver or processor which implements the navigation solution, but could be implemented in an external, peripheral processor, e.g., within the ECU.

The first step in deriving a position solution from GPS (or a position update from GPS to a dead reckoning system) is the formation of the Pseudo Range (PR) measurement residuals 100, indicated in Eqn. (1) below, which is essentially the difference in a measured pseudo range and a predicted pseudo range that is based on past history.

$$PR^i_{res} = PR^i_{meas} - PR^i_{pred} \quad (1)$$

where:

$PR^i_{res}$ is the pseudo range measurement residual to the ith GPS satellite;

$PR^i_{meas}$ is the pseudo range to the ith satellite derived by the CPS receiver; and $PR^i_{pred}$ is the predicted pseudo range to the ith satellite, derived by the navigation processing software.

The predicted pseudo range to each satellite, $PR^i_{pred}$, is derived by computing the range to the satellite from the predicted vehicle position and the estimated position of the satellite. If a dead reckoning system is included, it is used to predict the vehicle's current position from the last GPS updated position. The magnitude of each satellite's residual $PR^i_{res}$ is compared with a threshold which is proportional to the residual variance and used to detect and isolate a measured pseudo range which has failed, and also to remove it from subsequent processing, as indicated by box 110. The residual variance, which is used to compute the threshold, can be found from predictions of the expected error characteristics of the pseudo range (e.g., as could be computed from the signal to noise ratio and the level of SA degradation) and the expected error associated with predicting the vehicle's position (the predicted vehicle's position is used to form the predicted pseudo range, $PR^i_{pred}$ in Eqn. (1)).

In addition, the variance of the residual time history can be used to compute a measurement variance scaling factor 120. The scaling factor is found from the ratio of the computed residual variance (based on a time average of a predetermined number of computed residuals) to its expected value, based on the signal to noise ratio and the level of SA degradation imposed on each signal. This scaling factor represents the departure of the measurement error from its expected variance; e.g., a scaling factor of 4 for a particular satellite implies that the GPS pseudo range error is twice (corresponding to the square root of 4) its expected value, based on the residual statistic derived for that satellite. Alternatively, in LS and WLS implementations, the residual statistic can be computed and used to compute the scaling factor when the set of measurements is overdetermined, as discussed in the article. The use of Quality Control for Real-Time Differential GPS, by G. J. Geier, ION National Technical Meeting, June 1993, which is incorporated by reference herein.

Following computation of the scaling factor, it is used to scale each measurement error variance, computed from the expected error characteristics of each pseudo range, as determined from the signal to noise ratio and the expected level of SA degradation, as indicated by box 130 as shown in the following equation.

$$R^i_{scale} = V^i_{scale} R^i_{unscale} \quad (2)$$

where:

$R^i_{scale}$ is the scaled measurement error variance;

$R^i_{unscale}$ is the unscaled error variance; and $V^i_{scale}$ is the variance scaling parameter computed in box 120.

Given the scaled measurement error variance parameter, $R^i_{scale}$, the solution error covariance matrix P may be derived, as indicated by box 140 whereby the mathematics differs, dependent upon whether a LS or WLS or Kalman filter algorithm is used.

For a LS approach, P may be computed as follows:

$$P = MRM^T \quad (3)$$

For a WLS approach, P may be computed as follows:

$$P = (H^T R^{-1} H)^{-1} \quad (4)$$

where:

$M = (H^T H)^{-1} H^T$ is an n×m matrix, with the T superscript denoting matrix transpose operation, and the −1 denoting the matrix inverse operation;

n is the dimension of the solution vector (normally four for three components of position and time);

m is the number of GPS satellite measurement used in the solution;

H is the m×n measurement gradient matrix (i.e., the matrix whose rows represent the unit line-of-sight vectors to each satellite; and R is an m×m diagonal matrix, with ith element $R^i_{scale}$.

For a Kalman filter approach, P may be computed as follows:

$$P=(I-KH)P \qquad (5)$$

where:

$K=PH^T(HPH^T+R)^{-1}$ is the n×m Kalman gain matrix; and

I is the m×m identity matrix consisting of unity values along its diagonal.

Given the solution error covariance, the horizontal position error variance is derived as indicated by box 150 from the appropriate diagonal elements of P:

$$\sigma^2_{hor}=P(1,1)+P(2,2) \qquad (6)$$

where:

the index 1 corresponds to east position error; and the index 2 corresponds to north position error.

The horizontal position error variance $\sigma^2_{hor}$ is then tested against a threshold, as indicated by box 160 whereby the magnitude of the threshold is proportional to the worst-case solution error which can be tolerated by the emergency calling function. For example, if the navigation system is specified as providing 100 meters accuracy 95% of the time, the threshold against which $\sigma^2_{hor}$ should be compared is (100 meters)$^2$. If the threshold is exceeded, the ECU will appropriately illuminate the warning light, as indicated by box 170, and processing will continue (box 180). If the threshold is not exceeded, no warning is made.

Figure 3:
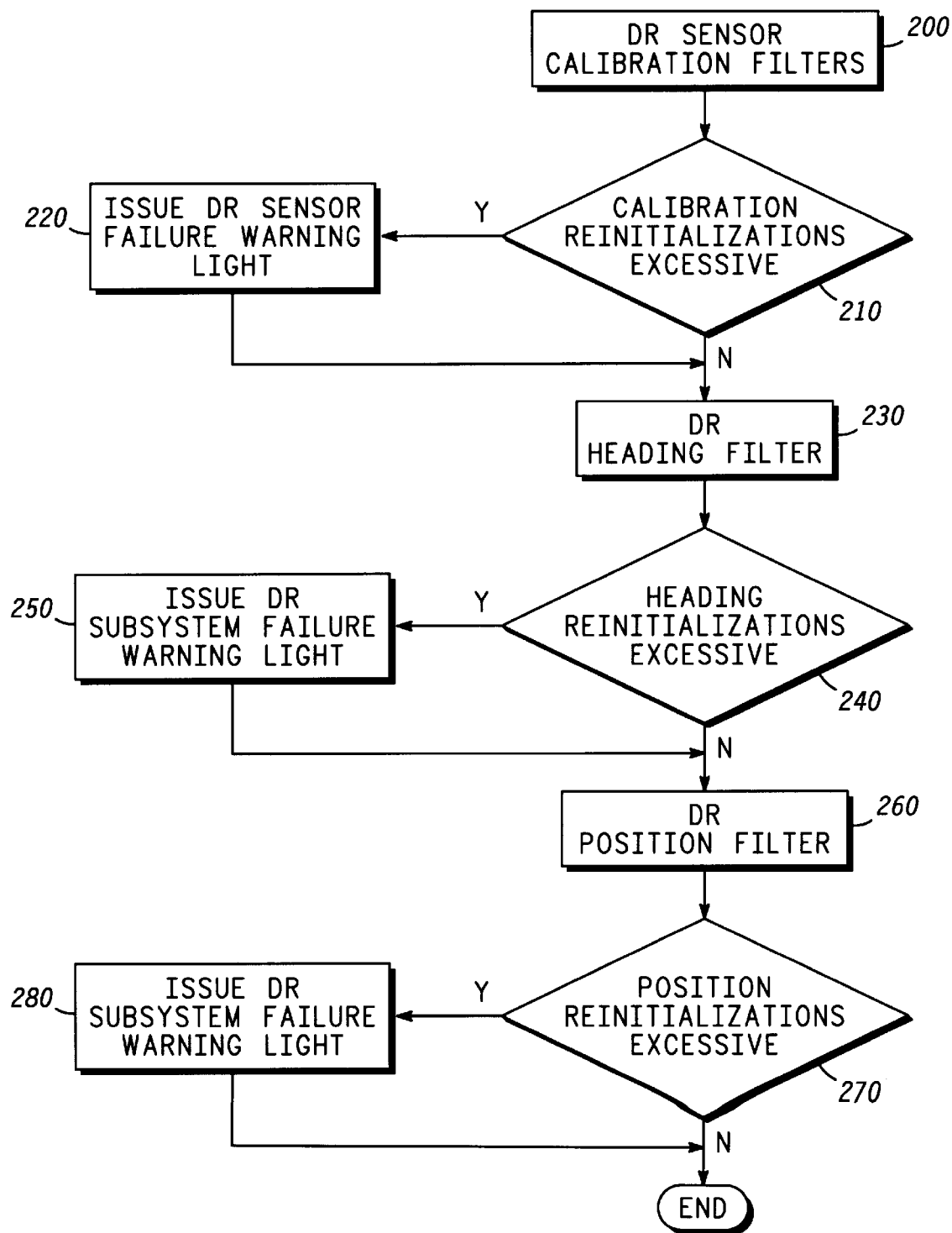
FIG. 3 is a flowchart illustrating the steps for indicating a malfunction in a positioning subsystem to a driver of a movable vehicle, in accordance with the present invention.

Referring now to FIG. 3, the sequence of steps for indicating a malfunction of the DR sensors or subsystem in an integrated positioning system used to support emergency call is illustrated. As aforementioned, such an indication would inform the operator/user of the vehicle that the emergency call system installed in the vehicle is functioning marginally, but requires service to be fully functional.

The first box 200 in FIG. 3 represents the function which calibrates the DR sensors whereby the specific nature of the calibration is a function of the DR sensors selected. For a system which integrates a transmission odometer with a low-cost gyro, as described, for example, in U.S. Pat. No. 5,416,712, the scale factors associated with the gyro-derived angular velocity, the odometer-derived speed, and the gyro zero-rate bias are calibrated. In a system based on the use of differential wheel speed to sense heading changes, on the other hand, the differential scale factor between left and right wheels is calibrated, as described, for example, in U.S. Pat. No. 5,402,365. Independent of the specific sensors utilized, the calibration filters generally make updates to the sensor calibration parameters based upon comparisons with corresponding GPS information. For example, differences between GPS speed and transmission odometer derived speed may be caused by an error in the odometer scale factor, and thus, be supplied as an input to the odometer scale factor filter.

The differences between GPS and DR sensor indications of speed or angular velocity are generally tested for reasonableness prior to their input to the appropriate DR calibration filter. If this reasonableness test fails, the GPS information is considered to be in error, and no update of the DR calibration parameters is made. However, persistent consecutive failures of the calibration filter may be indicative of failures within the DR sensors themselves. Following some number of such failures (typically on the order of five to ten), the DR calibration parameters (e.g., the differential scale factor associated with dual wheel speed sensors) are reset to their factory default values. This parameter reinitialization forces a counter within the appropriate calibration filter 200 to be incremented. When the counter reaches an unacceptably large number, as indicted by the condition in box 210, a DR sensor failure is detected, and an appropriate warning light is issued, as indicated by box 220. Depending upon which calibration filter produced the consistent failure, the faulty DR sensor can be isolated. For example, persistent failures of the odometer scale factor filter indicates that the odometer derived speed indication is faulty. Thus, this second type of warning is more diagnostic in nature, and could be displayed as a light with an alternate color from the ECS position integrity diagnostic or as a flashing light of the same color. By itself, it does not denote failure of the ECS, but rather indicates that the DR sensors are not performing properly and if service is not received soon, it may inevitably lead to ECS failure.

The persistent residual failures of the calibration filters mean that the filters are not able to run, due to excessive differences between the prior or propagated value of the estimated parameter and the current measured value. Momentary failures can be attributed to errors in GPS. However, persistent errors indicate that the DR sensor calibration is incorrect. For example, persistent failures of the odometer or differential odometer scale factor filters may indicate that a badly worn or otherwise mismatched tire is present, which should be replaced. For gyro applications, persistent failures of the calibration filters may indicate that the gyro is no longer performing to specification and should be replaced. This second level of diagnostic can therefore be invaluable in avoiding a future positioning integrity failure.

Following execution of the DR calibration filters 200 and associated warning light logic 210, the heading filter 230 is run. This filter updates the DR heading information with GPS headings when they are available. Prior to using the GPS heading information, the magnitude of its difference with the DR derived heading is examined for reasonableness whereby an excessive difference is attributed to an error in GPS, and the GPS heading is rejected. However, successive GPS heading rejections are attributed to an error in the DR headings, and result in a reset to the next GPS heading. Such heading reinitializations are counted by the heading filter 230, and tested against a threshold 240. If the threshold is exceeded, the DR subsystem has failed, and an appropriate warning light is issued 250.

A similar set of tests as with the heading filter are performed within the position filter 260, which combines GPS and DR positions. Again, excessive differences between GPS and DR position components result in rejections of the GPS positions. However, successive rejections trigger a reinitialization to GPS position. An excessive number of rejections, as tested in box 270, lead to the issue of a warning light 280, indicating that the DR subsystem has failed.

Accordingly, momentary failures associated with the processing of GPS positions or headings can be attributed to GPS errors (perhaps caused by reflected signal tracking or signal spoofing). However, persistent residual failures are generally indicative of errors in the DR propagated position, and should result in reinitializations to GPS and an indication that the DR system is malfunctioning.

By now it should be apparent that a novel Emergency Call System (ECS) that integrates positioning and cellular phone technology is provided. The ECS of the present invention provides an assessment, in real-time, of the integrity of the positioning solution and navigation sensors used to support the ECS. This integrity information is used, via a warning light displayed to the driver, to indicate when the system will not support Emergency Calling to the accuracies required. The present invention discusses that at least two types of warnings may be generated and provided to the user. The first being an indication that the positioning accuracy will no longer support Emergency Calling. The second being an indication that a sensor or subsystem of the Emergency Call positioning system is malfunctioning and should be serviced as soon as possible whereby such a malfunction may lead to eventual failure of the system.

While a preferred embodiment of the present invention is described, it is contemplated that various modifications may be made thereto without departing from the spirit and scope of the present invention. Accordingly, it is intended that the embodiments described be considered only as illustrative of the invention and that the scope of the invention be determined by the claims hereinafter provided.

What is claimed is:

1. A method for determining a loss of accuracy of a positioning system within an Emergency Call System (ECS) installed in a movable vehicle, said method comprising the steps of:

determining an accuracy of a position solution of said positioning system;

comparing said determined accuracy against a threshold value; and generating a warning to indicate that said ECS is not operational when said determined accuracy exceeds said threshold value based upon said step of comparing.

2. The method of claim 1 wherein said step of determining an accuracy includes using Kalman filtering covariance information.

3. The method of claim 1 wherein said step of determining an accuracy includes using Least Squares covariance information.

4. The method of claim 1 wherein said step of determining an accuracy includes using Weighted Least Squares covariance information.

5. The method of claim 1 wherein said step of determining an accuracy of a position solution includes using a dead reckoning system.

6. A method for determining the failure of a subsystem of a positioning system within an Emergency Call System (ECS) installed in a movable vehicle, said positioning system including a global positioning satellite (GPS) subsystem integrated with a dead reckoning (DR) subsystem, said method comprising the steps of:

determining an inconsistency between position solutions of said DR and GPS positioning subsystems;

isolating said inconsistency to either said GPS subsystem or said DR positioning subsystem; and providing an indication that said ECS is not operational when one of said positioning subsystems has failed when compared to a predetermined threshold.

7. The method of claim 6 wherein said step of determining includes using DR sensor calibration filters that uses GPS information to improve accuracy of DR sensors within said DR subsystem.

8. The method of claim 6 wherein said step of determining includes using a DR heading filter that combines DR heading information with GPS derived heading information.

9. The method of claim 6 wherein said step of determining includes using a DR position filter that combines DR position information with GPS derived position information.

10. The method of claim 6 wherein said step of providing an indication includes the step of generating a warning to a user of said ECS that one of said positioning subsystems has failed.

11. An Emergency Call System (ECS) for installation on a movable vehicle, comprising:

a cellular telephone system;

a positioning system for determining a location of said movable vehicle;

at least one sensor for activating said ECS;

means for determining an integrity of said positioning system and for providing a warning to a user when said positioning system has failed according to a threshold.

12. The ECS of claim 11 wherein said means for determining an integrity includes means for determining an accuracy of said positioning system.

13. The ECS of claim 11 wherein said positioning system includes a global positioning satellite (GPS) subsystem and a dead reckoning (DR) subsystem.

14. The ECS of claim 13 wherein said means for determining an integrity includes means determining an inconsistency between position solutions of said DR and GPS receiver subsystems.

* * * * *